United States Patent
Kim et al.

(10) Patent No.: US 10,331,208 B2
(45) Date of Patent: Jun. 25, 2019

(54) METHOD FOR OUTPUTTING IMAGE AND ELECTRONIC DEVICE SUPPORTING THE SAME

(71) Applicant: Samsung Electronics Co., Ltd., Gyeonggi-do (KR)

(72) Inventors: Yoon Joo Kim, Seoul (KR); Byung Hyun Ahn, Seoul (KR); Jae Eun Yang, Gyeonggi-do (KR); Il Hoe Jung, Seoul (KR); In Su Yu, Seoul (KR); Jin Ho Lim, Gyeonggi-do (KR); Byung Po Choi, Gyeonggi-do (KR); Jung Eun Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/865,416

(22) Filed: Jan. 9, 2018

(65) Prior Publication Data

US 2018/0196512 A1     Jul. 12, 2018

(30) Foreign Application Priority Data

Jan. 10, 2017    (KR) .................. 10-2017-0003733

(51) Int. Cl.
*G06F 1/16*         (2006.01)
*G06T 19/00*      (2011.01)
(Continued)

(52) U.S. Cl.
CPC .......... *G06F 3/013* (2013.01); *G02B 27/0093* (2013.01); *G02B 27/0172* (2013.01);
(Continued)

(58) Field of Classification Search
None
See application file for complete search history.

(56) References Cited

U.S. PATENT DOCUMENTS

| 7,499,594 B2 | 3/2009 | Kortum et al. |
| 7,783,120 B2 | 8/2010 | Kortum et al. |

(Continued)

FOREIGN PATENT DOCUMENTS

| EP | 1 205 881 A2 | 5/2002 |
| KR | 10-2015-0136440 A | 12/2015 |
| KR | 10-2017-0098106 A | 8/2017 |

OTHER PUBLICATIONS

Ichino, et al.; Can users read text on large displays?: Effects of Physical Display Size on Users' Reading Comprehension of Text; CHItaly; 2015; XP058074175.

(Continued)

*Primary Examiner* — Motilewa Good Johnson
(74) *Attorney, Agent, or Firm* — Cha & Reiter, LLC

(57) ABSTRACT

An electronic device according to one embodiment of the present disclosure includes a display, an eye-tracking unit, and a processor. The processor determines a user's region of interest of an image, collects context information of the electronic device, determines first attribute information relating to image processing for the region of interest of the image and second attribute information relating to image processing for the remaining region other than the region of interest of the image, based at least on the context information, and displays, on the display, a first partial image obtained by the image processing for the region of interest using the first attribute information and a second partial image obtained by the image processing for the remaining region using the second attribute information.

16 Claims, 9 Drawing Sheets

(51) Int. Cl.
*G06F 3/01* (2006.01)
*G02B 27/00* (2006.01)
*G02B 27/01* (2006.01)
*G06F 3/0481* (2013.01)

(52) U.S. Cl.
CPC ........ *G06F 1/1637* (2013.01); *G06F 3/04815* (2013.01); *G06T 19/006* (2013.01); *A63F 2300/8082* (2013.01); *G02B 2027/0123* (2013.01); *G02B 2027/0178* (2013.01)

(56) References Cited

U.S. PATENT DOCUMENTS

| | | | |
|---|---|---|---|
| 9,129,381 B2* | 9/2015 | Steinberg | H04N 5/232 |
| 9,316,834 B2 | 4/2016 | Makino et al. | |
| 2003/0194142 A1 | 10/2003 | Kortum et al. | |
| 2009/0185748 A1 | 7/2009 | Kortum et al. | |
| 2011/0043644 A1* | 2/2011 | Munger | G02B 27/017 |
| | | | 348/207.1 |
| 2012/0154277 A1* | 6/2012 | Bar-Zeev | G02B 27/017 |
| | | | 345/158 |
| 2013/0050070 A1* | 2/2013 | Lewis | A61B 3/113 |
| | | | 345/156 |
| 2013/0300635 A1* | 11/2013 | White | H04N 13/383 |
| | | | 345/7 |
| 2014/0192679 A1 | 7/2014 | Logvinov et al. | |
| 2014/0266990 A1 | 9/2014 | Makino et al. | |
| 2014/0347363 A1* | 11/2014 | Kaburlasos | G06F 3/013 |
| | | | 345/428 |
| 2016/0188181 A1* | 6/2016 | Smith | G06F 3/048 |
| | | | 715/765 |
| 2016/0259977 A1* | 9/2016 | Asbun | A61B 5/165 |
| 2016/0267884 A1 | 9/2016 | Binstock et al. | |
| 2016/0274365 A1* | 9/2016 | Bailey | G02B 27/0093 |
| 2017/0124760 A1* | 5/2017 | Murakawa | G06T 15/005 |
| 2017/0169602 A1* | 6/2017 | Blackmon | G06F 3/013 |
| 2017/0223368 A1* | 8/2017 | Abbas | H04N 19/146 |
| 2017/0244809 A1 | 8/2017 | Chae et al. | |
| 2017/0285736 A1* | 10/2017 | Young | G06F 3/013 |
| 2017/0287112 A1* | 10/2017 | Stafford | G06T 5/00 |
| 2017/0287446 A1* | 10/2017 | Young | G09G 5/391 |
| 2017/0318235 A1* | 11/2017 | Schneider | G02B 27/2228 |
| 2017/0339391 A1 | 11/2017 | Zhou et al. | |
| 2018/0077409 A1 | 3/2018 | Heo et al. | |
| 2018/0192058 A1* | 7/2018 | Chen | H04N 19/119 |

OTHER PUBLICATIONS

Koskela, et al.; "Foveated Path Tracing a Literature Review and a Performance Gain Analysis"; Springer International Publishing; 2016; XP047364702.
European Search Report dated May 16, 2018.

* cited by examiner

METHOD FOR OUTPUTTING IMAGE AND ELECTRONIC DEVICE SUPPORTING THE SAME

CLAIM OF PRIORITY

This application claims the benefit under 35 U.S.C. § 119(a) of a Korean patent application filed on Jan. 10, 2017 in the Korean Intellectual Property Office and assigned Serial number 10-2017-0003733, the entire disclosure of which is hereby incorporated by reference.

TECHNICAL FIELD

Various embodiments of the present disclosure generally relate to methods for outputting images and electronic devices supporting the same.

BACKGROUND

Electronic devices exist in the art for outputting virtual reality (VR) images or three-dimensional (3D) images. As technology has improved, these electronic devices have been made lighter and smaller. Examples of these electronic devices include smart glasses, head mount devices (hereinafter, referred to as HMDs), or the like.

For example, an HMD may be worn on a user's head. The HMD may display a screen in front of the user's eyes and may output a 3D image. The HMD may provide a variety of augmented reality (AR) effects or virtual reality (VR) effects.

SUMMARY

An HMD known in the art may use foveated rendering to reduce its processor load. Foveated rendering is a rendering technique that detects the direction of the user's gaze and outputs a high-resolution image in a region that corresponds to the detected direction of the gaze. Conversely, foveated rendering also outputs low-resolution images in peripheral regions that are outside the region that corresponds to the detected direction of the gaze.

When applying foveated rendering, the HMD may fix the size of the high-resolution region and fix or limit various factors in order to apply the foveated rendering. But such static foveated rendering may not be desirable. For example, if the user's gaze direction changes, but the high-resolution region is fixed, user experience may be diminished.

In accordance with an aspect of the present disclosure, an electronic device includes a display, an eye-tracking unit that obtains a user's gaze information, and a processor. The processor determines the user's region of interest of an image to be displayed on the display, by using the gaze information, collects context information of the electronic device, determines first attribute information relating to image processing for the region of interest of the image and second attribute information relating to image processing for the remaining region other than the region of interest of the image, based at least on the context information, and displays, on the display, a first partial image obtained by the image processing for the region of interest using the first attribute information and a second partial image obtained by the image processing for the remaining region using the second attribute information.

A method for outputting an image and an electronic device supporting the same, according to various embodiments of the present disclosure, may provide appropriate rendering result to the user by dynamically changing the foveated rendering according various pieces of information, such as terminal specification/status information, image analysis information, user selection information, and the like.

In a method for outputting an image and an electronic device supporting the same, according to various embodiments of the present disclosure, tuning factors of the foveated rendering may be changed according to a user's preference.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to indicate the same or similar elements, features, and structures.

DETAILED DESCRIPTION

Figure 1:
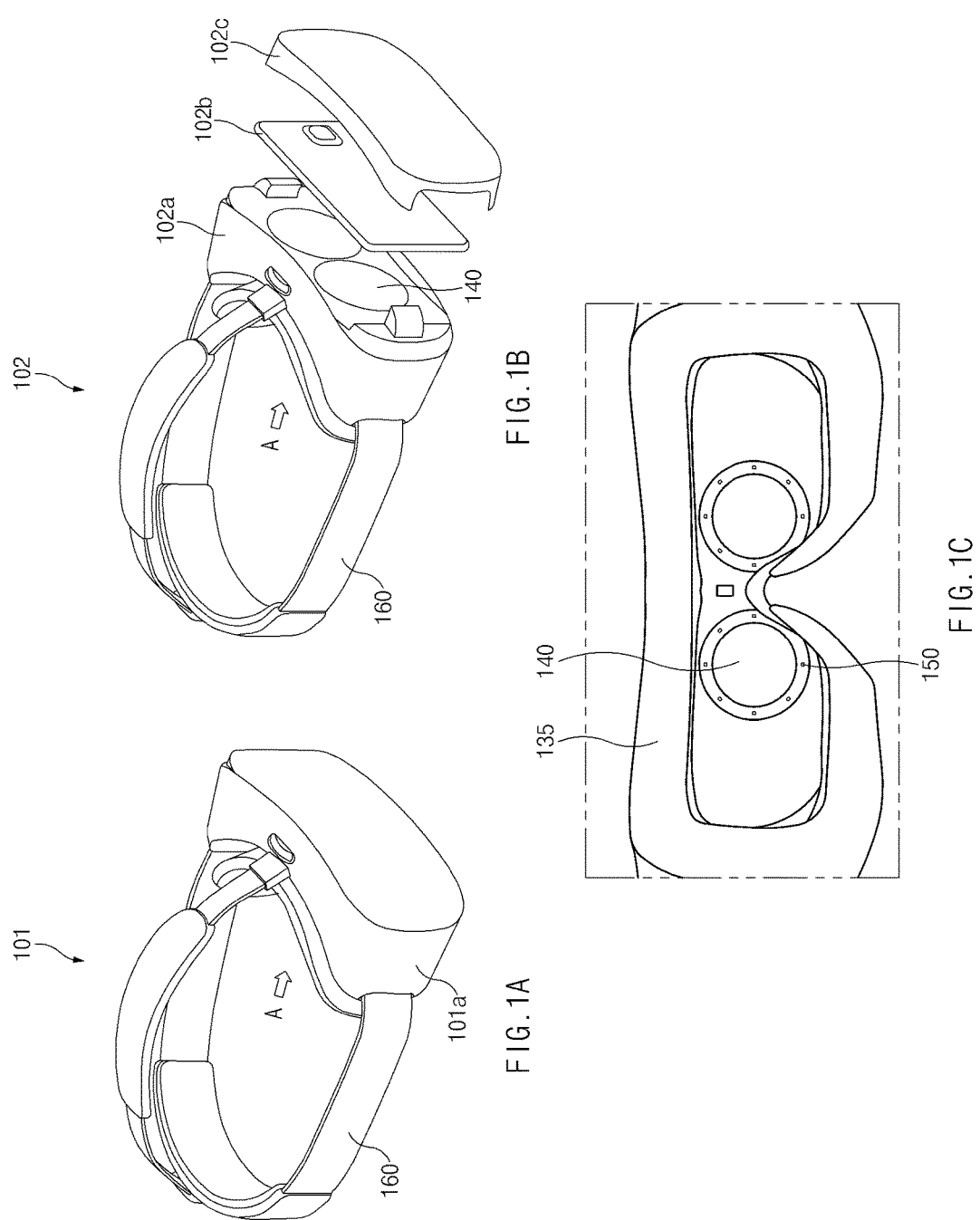
FIG. 1A.
FIG. 1B and FIG. 1C illustrate an external configuration of an HMD according to one embodiment.

Hereinafter, various embodiments of the present disclosure will be described with reference to the accompanying drawings. Accordingly, those of ordinary skill in the art will recognize that modifications, equivalents, and/or alternatives of the various embodiments described herein can be made without departing from the scope and spirit of the present disclosure.

In the disclosure disclosed herein, the expressions "have," "may have," "include," "comprise," "may include," and "may comprise" indicate existence of corresponding features (for example, elements such as numeric values, functions, operations, or components) but do not exclude presence of additional features.

In the disclosure disclosed herein, the expressions "A or B," "at least one of A or/and B," or "one or more of A or/and B," and the like may include any and all combinations of one or more of the associated listed items. For example, the term "A or B," "at least one of A and B," or "at least one of A or B" may refer to all of the cases (1) where at least one A is included, (2) where at least one B is included, or (3) where both of A and B are included.

The terms such as "first," "second," and the like used herein may refer to various elements of various embodiments of the present disclosure. But these terms do not limit the elements. For example, such terms are used only to distinguish an element from another element, but do not limit the order and/or priority of the elements. For example, a first user device and a second user device may represent different user devices irrespective of sequence or importance. Without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled to the other element or connected to the other element via an intervening element (for example, a third element). In contrast, when an element (for example, the first element) is referred to as being "directly coupled with/to" or "directly connected to" another element (for example, the second element), it should be understood that no intervening element (for example, the third element) is present.

The expression "configured to" used herein may mean "suitable for," "having the capacity to," "designed to," "adapted to," "made to," or "capable of." As such, the term "configured to" does not necessarily mean only "specifically designed to" in hardware. Instead, the expression "a device configured to" may mean that the device is "capable of" operating together with another device or other components. A "processor configured to perform A, B, and C," for example, may mean a dedicated processor (e.g., an embedded processor) for performing the specified operation or a generic-purpose processor (e.g., a central processing unit (CPU) or an application processor) which may perform the specified operation by executing one or more software programs which are stored in a memory device.

Terms used in the present disclosure are used to describe specified embodiments and are not intended to limit the scope of the present disclosure. The terms in singular form may also refer to the plural and vice versa, unless otherwise specified. Unless otherwise defined herein, all the terms used herein, which include technical and scientific terms, may have the same meaning that is generally understood by a person skilled in the art. It will be further understood that terms, which are defined in dictionaries and commonly used, should also be interpreted according to their customary meaning in the relevant related art and not according to other meanings unless expressly so defined herein. In some cases, even if a term is explicitly defined in the specification, it may not be interpreted to exclude embodiments of the present disclosure.

Electronic devices according to various embodiments of the present disclosure may be smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, or wearable devices. According to various embodiments of the present disclosure, the wearable devices may include accessories (for example, watches, rings, bracelets, ankle bracelets, glasses, contact lenses, or HMDs), cloth-integrated types (for example, electronic clothes), body-attached types (for example, skin pads or tattoos), or implantable types (for example, implantable circuits).

According to another embodiment, the electronic devices may be home appliances, such as televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the electronic devices may be medical devices (e.g., various portable medical measurement devices, such as blood glucose monitoring devices, heartbeat measuring devices, blood pressure measuring devices, body temperature measuring devices, etc., magnetic resonance angiography (MRA) devices, magnetic resonance imaging (MRI) devices, computed tomography (CT) devices, medical scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales devices (POSs), or IoT (Internet of Things) devices (e.g., light bulbs, sensors, electric or gas meters, sprinkler devices, fire alarms, thermostats, street lamps, toasters, exercise equipment, hot water tanks, heaters, boilers, and the like).

According to another embodiment, the electronic devices may be parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described devices or a combination thereof. An electronic device according to an embodiment may be a flexible device. Furthermore, an electronic device according to an embodiment may not be limited to the above-described electronic devices and may include other electronic devices developed in the art.

Hereinafter, electronic devices according to an embodiment of the present disclosure will be described with reference to the accompanying drawings. The term "user" used herein may refer to a person who uses the electronic device or may refer to a device (for example, an artificial electronic device) that uses the electronic device.

FIGS. 1A to 1C illustrate an external configuration of an HMD according to one embodiment. An HMD 101 or 102 may output a 3D virtual reality image. The HMD 101 or 102 may be implemented as a stand-alone device having its own display or as a drop-in holder such that another device (e.g., a smartphone) may be mounted in the HMD.

Referring to FIG. 1A, the HMD 101 may be worn over the user's eyes to display an image. The HMD 101 may be a stand-alone device such that it has its own display (not shown) that displays virtual reality (VR) images (hereinafter, referred to as VR images).

According to one embodiment, the HMD 101 may collect motion information from integrated sensors to recognize objects around the HMD 101 or the user.

The HMD 101 may output images in a field of view (FOV) region of the 3D VR image by tracking the user's head. Tracking of the user's head may be accomplished using the motion information from the integrated sensors. Thus, when the user moves his or her head, the motion information associated with the head movement may change, and accordingly the FOV region may also change.

According to one embodiment, the HMD 101 may include a main frame 101a and a mounting part 160 for securing the main frame 101a to the user's head. The main frame 101a may include a display for outputting the VR images, transparent/translucent lenses, a processor, a memory, and the like. The mounting part 160 may include an elastic band so that the main frame 101a is secured to the user's head and is close to the area around the user's eyes.

The HMD 101 may include a wireless communication component that communicates with a companion device (e.g., a smartphone), a server, or another network component. The HMD 101 may be configured to directly communicate with the external server, or may be configured to communicate with the server through the companion device that is local to the user.

Referring to FIG. 1B, the HMD 102 may include a main frame 102a, a display device 102b, a cover 102c, and the mounting part 160 that secures the main frame 102a to the user's head. As shown, the HMD 102 is a drop-in holder for the display device 102b (e.g., a smartphone) mounted therein, which is different from the HMD 101 in FIG. 1A.

The main frame 102a may include space or a structure for receiving the display device 102b. The main frame 102a may further include a connector configured to couple to an electrical connector (e.g., a micro USB) of the display device 102b so that the HMD 102 can communicate with the display device 102b.

According to this embodiment, the main frame 102a may include a touch panel for providing a user interface. The main frame 102a may include different types of control devices for controlling the display device 102b, such as physical keys, physical buttons, touch keys, one or more joysticks, one or more wheel keys, or touch pads.

The main frame 102a may be connected with the display device 102b through a connector, such as a USB connector, and a touch input received by the touch panel of the main frame 102a may be transmitted to the display device 102b. In response to the touch input received from the touch panel, the display device 102b may perform a function corresponding to the touch input. For example, the display device 102b may adjust the volume or adjust the displayed image, in response to the received touch input.

The main frame 102a may be implemented with a relatively light material (e.g., plastic) to provide comfort for the user. For strength or aesthetically-pleasing appearance, the main frame 102a may include various other materials, such as glass, ceramic, metal (e.g., aluminum), metal alloy (e.g., steel, stainless steel, titanium, magnesium alloy), etc.

The main frame 102a may include, on one surface thereof, a storage space in which the display device 102b is mounted. The parts that define the storage space may be elastic or flexible. Thus, due to the elasticity or flexibility, the size of the storage space may vary, and display device 102b of various sizes may be mounted in the storage space.

The display device 102b (e.g., a smartphone) may be used when mounted on the HMD 102, or may be separated from the HMD 102 and independently operate. The display device 102b may include a display, a processor, a communication module, and the like.

A lens unit 140 may be located between the display device 102b and the user's eyes. Light emitted from the display device 102b may pass through the lens unit 140.

Referring to FIG. 1C, the main frame 101a or 102a may include a face contact part 135 on the inner surface of the main frame 101a or 102a (when viewed in the direction of arrow A). When worn, the face contact part 135 may be in contact with the user's face. The face contact part 135 may be curved to correspond to the contours of the human face and may be at least partially elastic. The face contact part 135 may further include a nose recess having a shape that corresponds to the shape of the user's nose.

The lens unit 140 may be disposed on the face contact part 135 so that when worn, the lens unit 140 is between the user's eyes and the display of the HMD.

According to one embodiment, an eye-tracking unit (or sensor) 150 may be disposed around the lens unit 140. The eye-tracking unit 150 may detect the direction of the user's gaze (hereinafter may be referred to as the user's gaze direction). For example, for the purpose of eye-tracking, the eye-tracking unit 150 may include six infrared lighting devices for each lens, an infrared reflector, and one or more cameras for capturing reflected light.

In the foveated rendering mode, the HMD 101 or 102 may output a high-resolution image within a specified range of the user's gaze direction (hereinafter, the range may be referred to as the region of interest). The HMD 101 or 102 may output a low-resolution image outside the specified range (hereinafter, referred to as the peripheral region). Thus, in the foveated rendering mode, the HMD 101 or 102 may reduce the processor load by reducing the computational complexity for the image data processing. The unused processor power may then be used to improve other aspects of the VR or AR experience. For example, the frame rate of the images displayed by the HMD may be increased.

According to one embodiment, in the foveated rendering mode, the HMD 101 or 102 may change tuning factors (e.g., the size of the region of interest, the size of the FOV, and the like) used in the foveated rendering mode. These tuning factors may be changed based on context information (or status information) of the HMD 101 or 102 (e.g., the processor load, the GPU load, power remaining in the battery, and the like), user setting information (e.g., a user-specified quality index, performance index, whether the HMD is in a battery save mode, and the like), or scene analysis information of the displayed image (e.g., the type of image, object information in the displayed image, resolution, and the like). Additional information about changing the tuning factors are provided in FIGS. 2 to 8.

Figure 2:
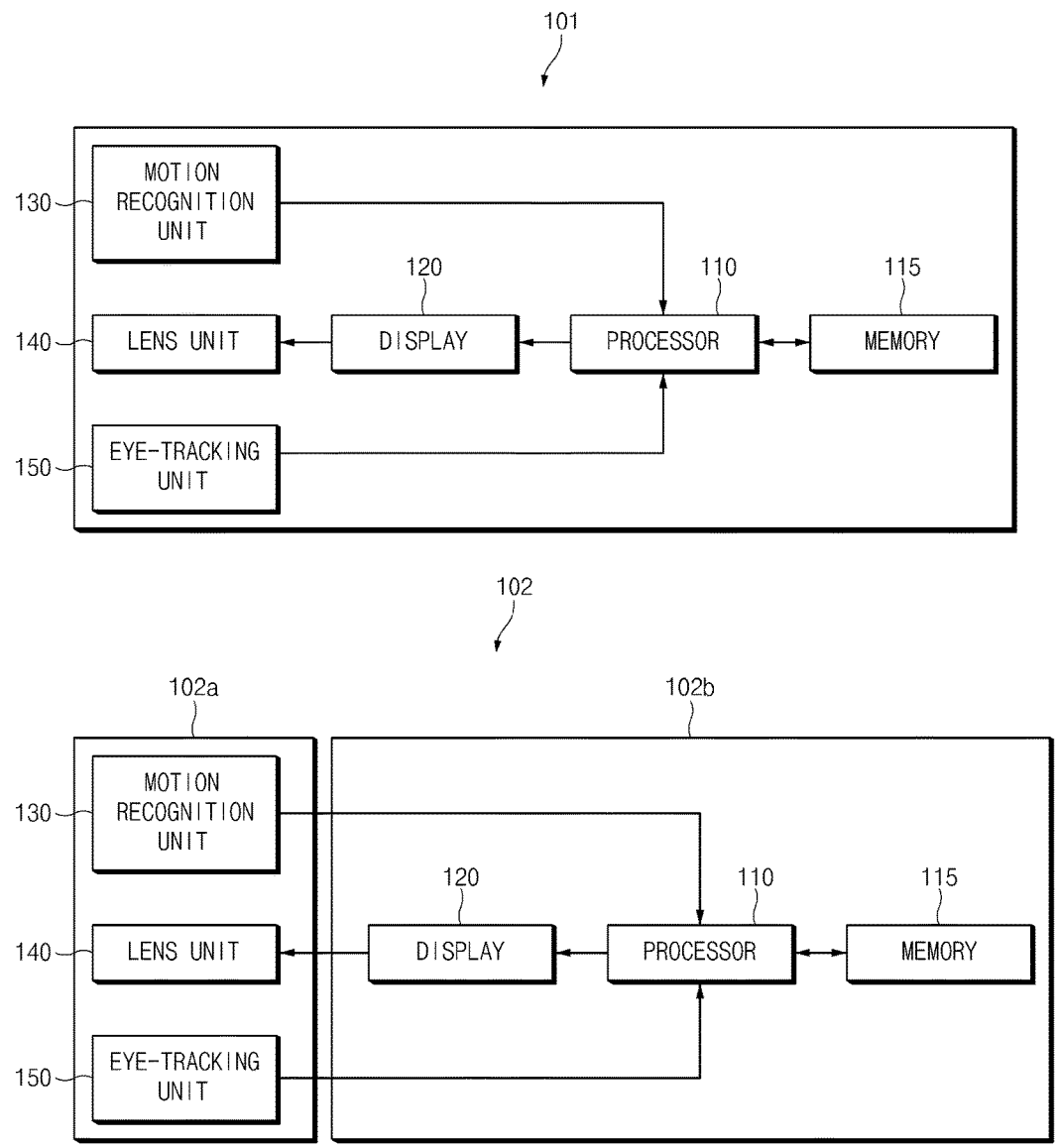
FIG. 2 is a block diagram of two HMDs according to two embodiments.

FIG. 2 is a block diagram of two HMDs according to two embodiments.

Referring to FIG. 2, the HMD 101 may include a processor 110, a memory 115, a display 120, a motion recognition unit 130, the lens unit 140, and the eye-tracking unit 150. According to one embodiment, the aforementioned elements may be mounted in the main frame 101a of FIG. 1A.

The processor 110 may drive, for example, an operating system (OS) or an embedded software program to control the plurality of hardware elements (e.g., the display 120, the motion recognition unit 130, the lens unit 140, and the eye-tracking unit 150) that are connected to the processor 110. The processor 110 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to one embodiment, the processor 110 may load, from the memory 115, all or part of a VR image to be output, and may output the loaded VR image through the display 120. The processor 110 may determine whether to enter foveated rendering mode, and determine the tuning factors necessary for the foveated rendering mode.

The memory 115 may store the VR image, or may store various pieces of information relating to the foveated rendering mode. For example, the memory 115 may store information relating to the tuning factors.

The display 120 may output the VR image. In the foveated rendering mode, one region of the image output through the display 120 (e.g. the region of interest) may have relatively high resolution, and other regions (e.g. the peripheral region) may have relatively low resolution.

The motion recognition unit 130 may measure motion or may detect an operating state of the HMD 101. The motion recognition unit 130 may include, for example, an acceleration sensor, a gyro sensor, a geo-magnetic sensor, a magnetic sensor, a proximity sensor, a gesture sensor, a grip sensor, and/or a biometric sensor. The HMD 101 may detect motion of the user's head by using the acceleration sensor, the gyro sensor, and the geo-magnetic sensor. The HMD 101 may also detect whether the HMD 101 is worn by the user by using the proximity sensor or the grip sensor.

Light output from the display 120 may pass through the lens unit 140. The processor 110 may correct the displayed image so as to prevent image distortion that may be caused by the lens unit 140.

The eye-tracking unit (or sensor) 150 may track the user's gaze direction. The eye-tracking unit 150 may include, for example, an infrared lighting device, an infrared reflector, and one or more cameras for capturing reflected light. In another example, the eye-tracking unit 150 may track the user's gaze by using electrical oculography (EOG) sensors, coil systems, dual purkinje systems, bright pupil systems, or dark pupil systems.

According to one embodiment, when the HMD 101 is worn by the user and the user moves the user's eyes, the eye-tracking unit 150 may detect the user's gaze direction. In the foveated rendering mode, the processor 110 may change the position of the high-resolution region according to the user's gaze direction.

The HMD 102 may include the motion recognition unit 130, the lens unit 140, and the eye-tracking unit 150 in the main frame 102a, and the processor 110, the memory 115, and the display 120 may be included in the display device 102b. Operations and functions of the elements in the HMD 102 may be the same as or similar to the operations and functions of the corresponding elements in the HMD 101.

The HMD 102 is merely illustrative, and the present disclosure is not limited thereto. For example, all or a part of the motion recognition unit 130 may be included in the display device 102b.

Figure 3:
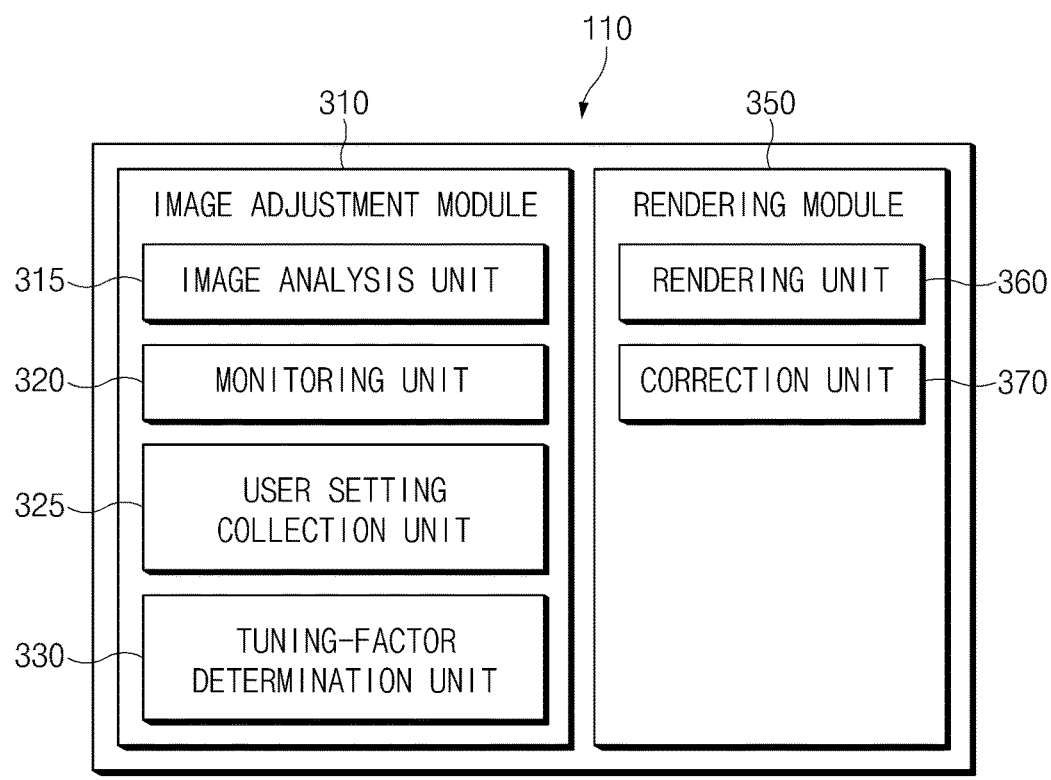
FIG. 3 is a block diagram illustrating software modules according to one embodiment.

FIG. 3 is a block diagram illustrating software modules according to one embodiment. Although FIG. 3 illustrates separate software modules, the present disclosure is not limited thereto. For example, two or more modules illustrated in FIG. 3 may be combined into a single module.

Referring to FIG. 3, the processor 110 may include an image adjustment module 310 and a rendering module 350.

The image adjustment module 310 may determine tuning factors to be applied to the foveated rendering mode. The image adjustment module 310 may determine the tuning factors based on scene information of the displayed image (e.g., the type of image, object information in the displayed image, resolution of the displayed image, and the like), context information of the HMD 101 or 102 (e.g., the processor load, the GPU load, power remaining in the battery, and the like), or user setting information (e.g., a user-specified quality index, performance index, whether the HMD is in a battery save mode, and the like).

According to one embodiment, the image adjustment module 310 may include an image analysis unit 315, a monitoring unit 320, a user setting collection unit 325, and a tuning-factor determination unit 330.

The image analysis unit 315 may analyze characteristics of the VR image output. For example, the image analysis unit 315 may determine the type of VR image (e.g., whether the image is a still image, a moving image, or a 3D image), object information in the image (e.g., the size and number of objects), the resolution of the image, or the like.

The monitoring unit 320 may monitor the status of the HMD 101 or 102. The monitoring unit 320 may obtain information such as the CPU and/or GPU load of the HMD, the internal or external temperature of the HMD, memory utilization, power remaining in the battery of the HMD, and the like.

The user setting collection unit 325 may collect a user input relating to foveated rendering. For example, the user setting collection unit 325 may output a user interface for setting the quality index of the VR image to be output and may collect the quality index selected by a user. Tuning factors (e.g., the size of the region of interest, the size of the FOV, and the like) may be changed depending on the quality index selected by the user. Additional settings for the foveated rendering may be output by the user setting collection unit 325. These settings are further described in connection with FIG. 7 below.

The tuning-factor determination unit 330 may determine the tuning factors for the foveated rendering, based on information received from the image analysis unit 315, the monitoring unit 320, and the user setting collection unit 325. The tuning factors may include information about the size of the region of interest, the size of the FOV, the size of a frame buffer used in foveated rendering, whether to apply anti-aliasing, and the like. Additional descriptions of the tuning factors are provided below in connection with FIG. 8.

The rendering module 350 may perform foveated rendering using the tuning factors determined by the tuning-factor determination unit 330. According to one embodiment, the rendering module 350 may include a rendering unit 360 and a correction unit 370.

The rendering unit 360 may render the VR image to be displayed on the display 120. In the foveated rendering mode, the rendering unit 360 may maintain the region of interest at a relatively high resolution and may render the peripheral region at a relatively low resolution.

According to one embodiment, the rendering unit 360 may perform image blending on the boundary between the region of interest and the peripheral region so that the transition from high resolution to low resolution is more seamless.

The correction unit 370 may correct the rendered image to prevent image distortion caused by the lens unit 140.

According to one embodiment, an image output method performed in an electronic device configured to output at least part of a 3D image, may include: collecting at least one of status information of the electronic device, analysis information of the 3D image, and user input information about an output of the 3D image, determining a tuning factor for applying foveated rendering to the outputted part of the 3D image, based on the collected information, and applying the foveated rendering to the outputted part of the 3D image, based on the determined tuning factor.

According to one embodiment, the user input information includes information about a quality index and/or a performance index selected by a user through a user interface.

According to one embodiment, the determining of the tuning factor includes determining the tuning factor based on the quality index and/or the performance index.

According to one embodiment, the determining of the tuning factor is done before outputting the 3D image.

According to one embodiment, the determining of the tuning factor is done while outputting the 3D image.

According to one embodiment, the user input information is collected through a user interface including a plurality of items relating to the output of the 3D image, and the determining of the tuning factor includes determining the tuning factor based on an item among the plurality of items selected by the user.

Figure 4A:
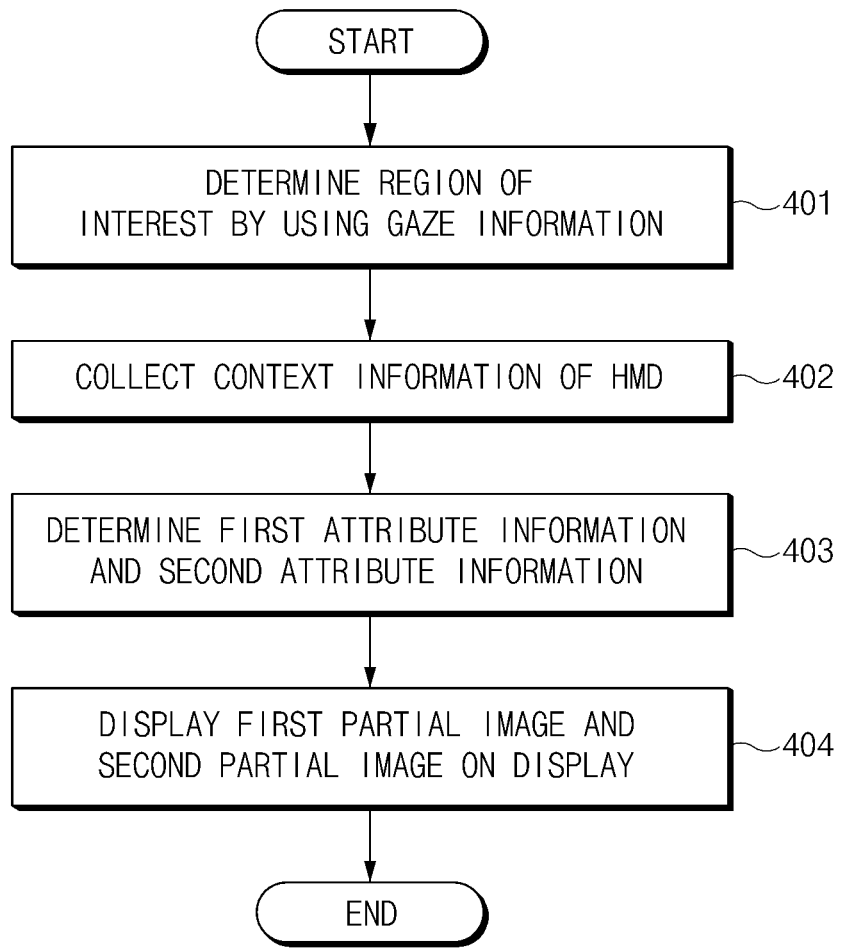
FIG. 4A is a flowchart illustrating a method for outputting an image by using context information of an HMD, according to one embodiment.

FIG. 4A is a flowchart illustrating a method for outputting an image by using context information of an HMD, according to one embodiment.

Referring to FIG. 4A, in operation 401, the processor 110 may determine the user's region of interest in an image to be displayed on the display 120. This may be done by using the user's gaze information collected by the eye-tracking unit 150.

In operation 402, the processor 110 may collect context information of the HMD 101 or 102. As explained above, the context information may include the CPU and/or GPU load of the HMD, the internal or external temperature of the HMD, memory utilization, power remaining in the battery of the HMD, and the like.

According to one embodiment, as part of determining the context information, the processor 110 may analyze the scene information of the image to be displayed. For example, the processor 110 may determine the complexity of the image to be displayed. The processor 110 may determine tuning factors of foveated rendering by using the determined scene complexity.

In operation 403, based on the context information, the processor 110 may determine first attribute information relating to the image processing for the region of interest and second attribute information relating to the image processing for the remaining region (e.g. the peripheral region). The first attribute information and the second attribute information may be various tuning factors necessary for the foveated rendering. For example, the first attribute information may be the size, shape, or resolution of the region of interest and/or the size of the frame buffer needed to store the data for the image in the region of interest. The second attribute information may be the size of the FOV region, whether to apply anti-aliasing, and/or the size of the frame buffer needed to store the data for the image in the peripheral region.

According to one embodiment, the processor 110 may receive a user input for determining a processing mode for the image to be displayed on the display 120. The processor 110 may determine at least part of the first attribute information and/or the second attribute information according to the processing mode selected by the user.

For example, when the processing mode is a first mode, the processor 110 may determine the first attribute information and the second attribute information to make the processing speed of the image to be displayed a priority.

On the other hand, when the processing mode is a second mode, the processor 110 may determine the first attribute information and the second attribute information to make the processed quality of the image to be displayed a priority. Additional information about the processing modes is provided below in connection with FIG. 7.

In operation 404, the processor 110 may display, on the display 120, a first partial image obtained by image-processing the region of interest by using the first attribute information and a second partial image obtained by image-processing the peripheral region by using the second attribute information. The processor 110 may then combine the first partial image and the second partial image. The processor 110 may perform image blending on the boundary between the region of interest and the peripheral region so that the transition from high resolution to low resolution is more seamless.

Figure 4B:
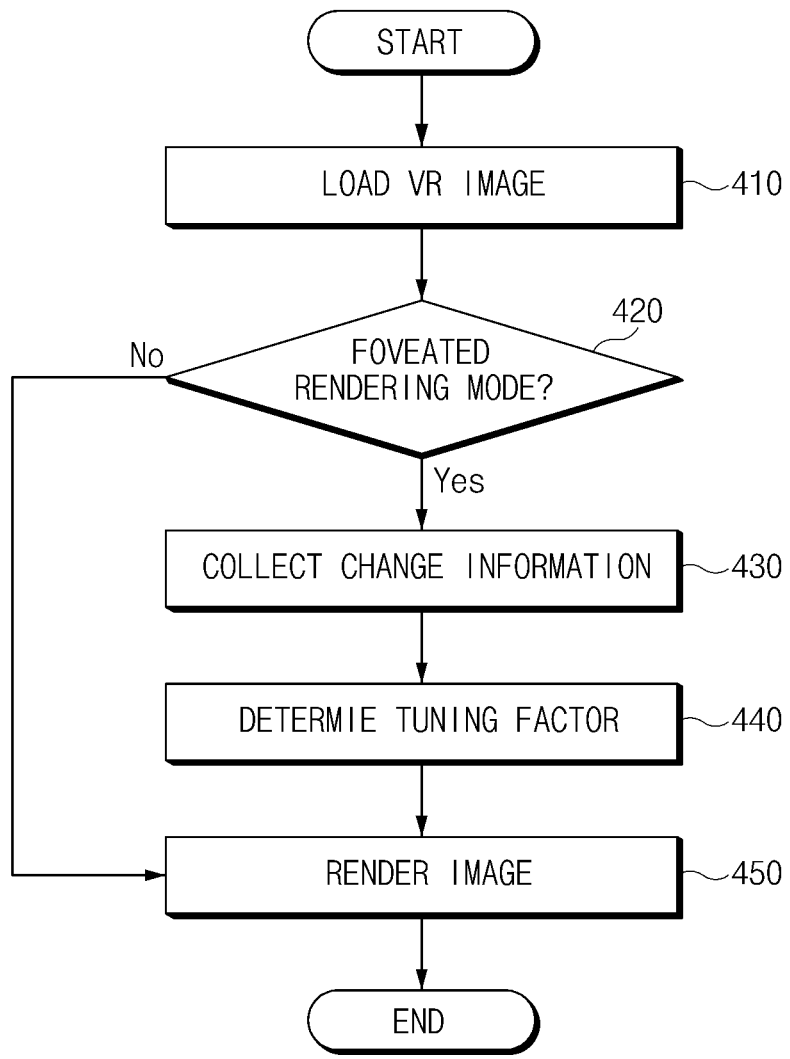
FIG. 4B is a flowchart illustrating a method for outputting an image, according to one embodiment.

FIG. 4B is a flowchart illustrating a method for outputting an image, according to one embodiment.

Referring to FIG. 4B, in operation 410, the processor 110 may load a VR image. According to one embodiment, the processor 110 may preferentially process only a part of the VR image, such as the portion of the image that is moving. The processor 110 may set reference values for the direction, position, and the like of the HMD 101 or 102.

In operation 420, the processor 110 may determine whether to apply the foveated rendering mode. According to an embodiment, the processor 110 may automatically apply the foveated rendering mode when the foveated rendering mode is the default setting, or may apply the foveated rendering mode when the user selects it through a user interface.

In the case where the foveated rendering mode is not applied, the processor 110 may render the entire image at a specified resolution (e.g., high resolution) without distinguishing between the region of interest and the peripheral region.

In the case where the foveated rendering mode is applied, the processor 110 may, in operation 430, collect change information for changing tuning factors of the foveated rendering mode.

According to an embodiment, the change information may include context information about the status of the HMD 101 or 102. For example, the context information may include information about the current processing load of the processor 110, operating states of the communication chip and the display drive circuit of the HMD 101 or 102, the power remaining in the battery of the HMD 101 or 102, the internal or external temperature of the HMD 101 or 102, and the like.

According to an embodiment, the change information may include information about the complexity of the image to be output. For example, this may include information about the type of VR image (e.g., whether the image is a still image, a moving image, a 3D image, etc.), the objects in the image (e.g., the size and number of objects), the resolution of the image, or the like. The processor 110 may determine the complexity of the image based on the computational complexity needed to render the image.

According to an embodiment, the change information may include information about a user input (or user selection in a UI) relating to foveated rendering. For example, in the case where the user sets a particular quality index for the VR image to be output, the processor 110 may adjust tuning factors of the foveated rendering to maintain the VR image to be displayed at a resolution corresponding the selected quality index. In another example, when the user selects an option to make battery-saving a priority, the processor 110 may decrease the size of the region of interest in the VR image, or may reduce the resolution of the portion of the VR image that requires high computational complexity.

In operation 440, the processor 110 may determine tuning factors on the basis of the change information. For example, the processor 110 may change or adjust tuning factors relating to the size of the region of interest, the size of the FOV, the size of the frame buffer for the VR image to be displayed, whether to apply anti-aliasing, and the like.

In operation 450, the processor 110 may render the VR image on the basis of the determined tuning factors. The processor 110 may output the rendered image on the display 120.

According to an embodiment, the processor 110, before outputting the VR image, may identify change information and may determine tuning factors on the basis of the change information. In this case, the tuning factors may be fixed while the VR image is being output. For example, before the processor 110 outputs a moving image, the processor 110 may analyze the size of the moving image, objects in each scene of the moving image, determine the power remaining in the battery, etc. and may determine the tuning factors based on these various analyses and determinations. The VR image may be displayed based on the determined tuning factors, and the tuning factors may be fixed during the display of the VR image.

According to another embodiment, the processor 110, while outputting a VR image, may identify change information and may change tuning factors on the basis of the change information. Thus in this embodiment, the tuning factors are not fixed during the display of the VR image. For example, when a 3D image is output at a specified fps (e.g., 60 fps), the processor 110 may change tuning factors after the display of a specified number of frames (e.g., 10 frames).

When the user selects a particular quality index, the processor 110, before outputting the VR image, may determine whether the corresponding quality index is satisfied by the default tuning factors. If so, the processor 110 may maintain the tuning factors set. Otherwise, the processor 110 may change the tuning factors to satisfy the selected quality index.

Also, when the user selects a particular quality index, the processor 110, while outputting the VR image, may determine whether the selected quality index is satisfied. If so, the processor 110 may maintain the current tuning factors. But if not, the processor 110 may change the tuning factors to satisfy the selected quality index.

Figure 5:
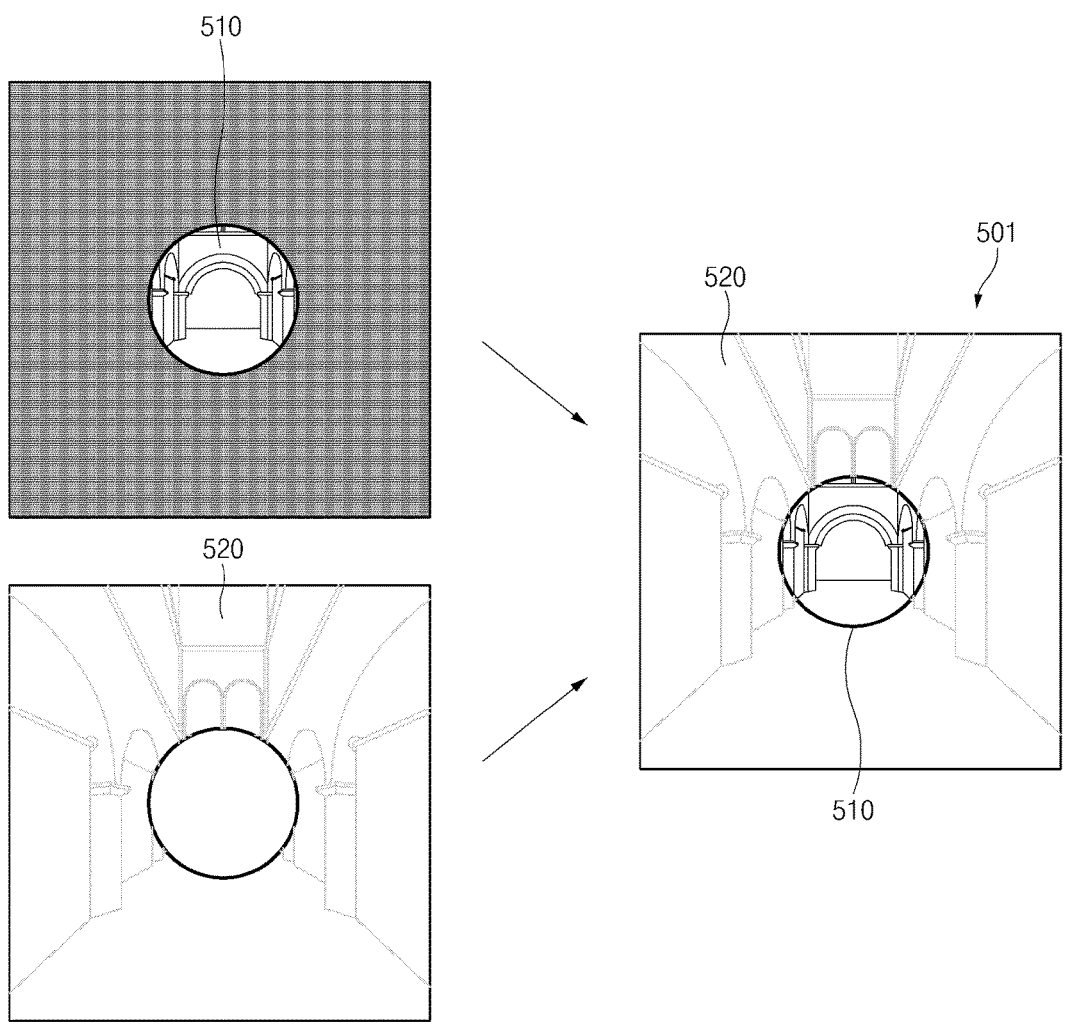
FIG. 5 illustrates an application of foveated rendering to an image, according to one embodiment.

FIG. 5 illustrates an application of foveated rendering to an image, according to one embodiment.

Referring to FIG. 5, an output image 501 may be include a region of interest (in a first layer) 510 having relatively high resolution and a peripheral region (in a second layer) 520 having relatively low resolution.

According to one embodiment, image data for the image in the region of interest 510 and image data for the image in the peripheral region 520 may be stored in different buffers. To display the entire output image 501, the image data in the different buffers may be subsequently combined together.

For example, the processor 110 may store the image data for the image in the region of interest 510 in a first buffer called a high-resolution frame buffer (HFB). According to an embodiment, the image data stored in the first buffer may have the same resolution as the original VR image.

The processor 110 may store the image data for the image in the peripheral region 520 in a second buffer called a low-resolution frame buffer (LFB). The image data stored in the second buffer may have a lower resolution than the original VR image.

The image data in the first buffer and the image data in the second buffer may be combined together in yet another separate frame buffer called an output buffer. For example, the processor 110 may render the image data in the first buffer (e.g., the HFB) and the image data in the second buffer (e.g., the LFB) and may combine and store the rendered image data in the output buffer.

Alternatively, the image data in the first buffer and the image data in the second buffer may be combined together in the first buffer. To account for the lower resolution, the processor 110 may magnify the image of the peripheral region and store the corresponding image data in the first buffer.

According to one embodiment, the processor 110 may perform anti-aliasing on the image data of the peripheral region 520. Accordingly, it is possible to prevent aliasing which may occur when the low-resolution image of the peripheral region 520 is magnified.

The processor 110 may perform image blending on the boundary between the region of interest and the peripheral region, or on the region adjacent to the boundary. Accordingly, the transition from high resolution to low resolution is more seamless. For example, the processor 110 may gradually reduce the resolution at the edge of the region of interest 510 such that at the outermost edge of the region of interest, the resolution is the same as, or similar to, the resolution of the peripheral region 520.

The processor 110 may change the size of the region of interest 510 according to tuning factors. For example, the processor 110 may decrease or increase the size of the region of interest 510 according to the particular quality index selected by the user.

Figure 6:
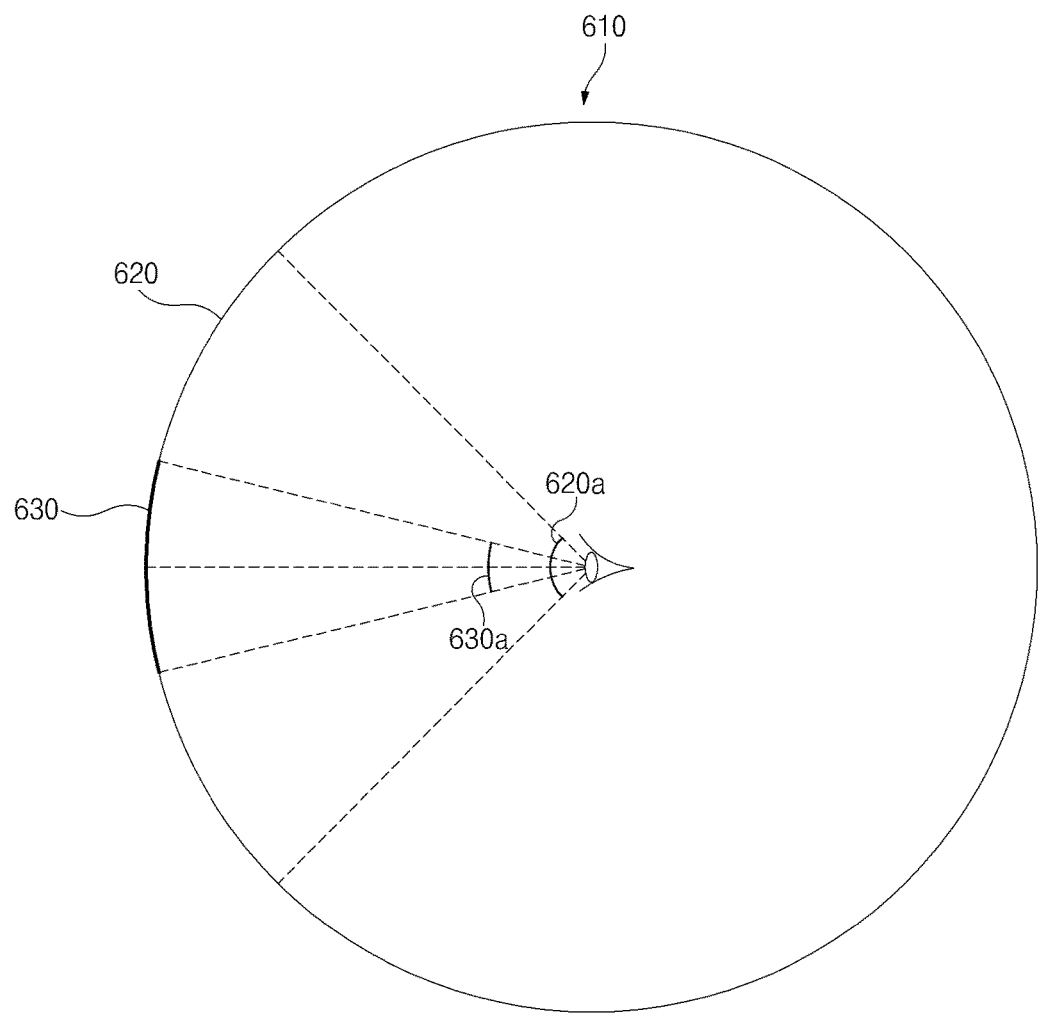
FIG. 6 illustrates an FOV image and an image of a region of interest, according to one embodiment.

FIG. 6 illustrates an FOV image and an image of a region of interest, according to one embodiment.

Referring to FIG. 6, the processor 110 may store an FOV image 620, which is part of a VR image 610, in a frame buffer based on the motion information of the HMD collected through the motion recognition unit 130. The FOV image 620 may then be displayed on the display 120 of the HMD. When the motion information changes (e.g., when user moves his or her head), the processor 110 may change the position of the FOV and display a different FOV image. For example, when the user moves the head upwards, downwards, leftwards, or rightwards, the position of the FOV may be shifted upwards, downwards, leftwards, or rightwards, and different FOV images may be displayed.

The processor 110 may process the image 630 of the region of interest, which is part of the FOV image 620, at a higher resolution. The region of interest may be determined based on the user's gaze direction information collected through the eye-tracking unit 150. In the case where the user moves his or her pupils and thereby changes the gaze direction information, the processor 110 may change the position of the region of interest. For example, when the user moves his or her pupils upwards, downwards, leftwards, or rightwards without moving his or her head, the position of the region of interest may be shifted upwards, downwards, leftwards, or rightwards according to the degree of movement of the pupils.

According to one embodiment, the processor 110 may change the FOV angle 620a or the angle 630a of the region of interest based on scene information of the displayed image (e.g., the type of image, object information in the displayed image, resolution of the displayed image, and the like), context information of the HMD 101 or 102 (e.g., the processor load, the GPU load, power remaining in the battery, and the like), or user setting information (e.g., a user-specified quality index, performance index, whether the HMD is in a battery save mode, and the like).

For example, in the case where the user increases the quality index of the VR image to be output, the FOV angle 620a and the angle 630a of the region of interest may increase.

In another example, in the case where the user decreases the quality index of the VR image to be output, the FOV angle 620a and the angle 630a of the region of interest may decrease.

In another example, in the case where the user decreases the quality index of the VR image to be output, the processor 110 may first decrease the angle 630a of the region of interest and may determine whether the selected quality index is satisfied. However, to guarantee satisfactory performance, the angle 630a of the region of interest may be required to be at a minimum of 25 degrees. When the angle 630a of the region of interest is minimized to 25 degrees but the selected quality index is still not satisfied, the processor 110 may additionally decrease the FOV angle 620a.

Figure 7:
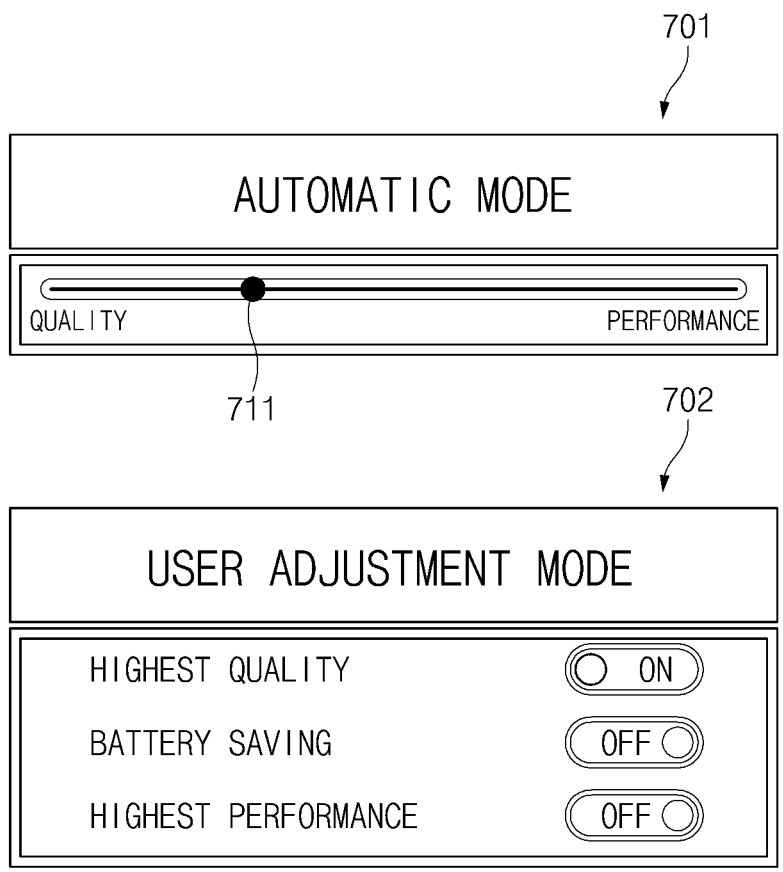
FIG. 7 illustrates user interfaces (UIs) for user settings, according to one embodiment.

FIG. 7 illustrates user interfaces (UIs) for user settings, according to one embodiment. FIG. 7 is merely illustrative, and the present disclosure is not limited thereto.

Referring to FIG. 7, the processor 110 may output an automatic mode UI 701. The automatic mode UI 701 may include a status bar 711 through which the user determines the quality index and performance index of the foveated rendering, where the quality index and the performance index have a trade-off relationship (i.e. the quality index and the performance index are inversely proportional). After the desired quality index is selected by the user, the processor 110 may determine tuning factors based on the selected quality index.

For example, when the user selects a relatively high quality index, the region of interest may be relatively wide, and the FOV may also be relatively large. In this case, frames per second (fps) of the displayed VR image may decrease. In contrast, when the user selects a relatively low quality index, the region of interest may be relatively narrow, and the FOV may be relatively small. But the frames per second (fps) may increase.

The processor 110 may output a user adjustment mode UI 702. The user adjustment mode UI 702 may include a variety of items relating to foveated rendering. For example, in the case where the user selects the highest quality, the processor 110 may determine tuning factors to obtain the highest resolution at a given power consumption level of the HMD According to one embodiment, the processor 110 may change the tuning factors based on the user's selections in the interfaces shown in FIG. 7. The processor 110, while outputting the VR image, may determine whether the current output state satisfies the user's selections, and may dynamically change the tuning factors when the current output state does not satisfy the user's selections.

Figure 8:
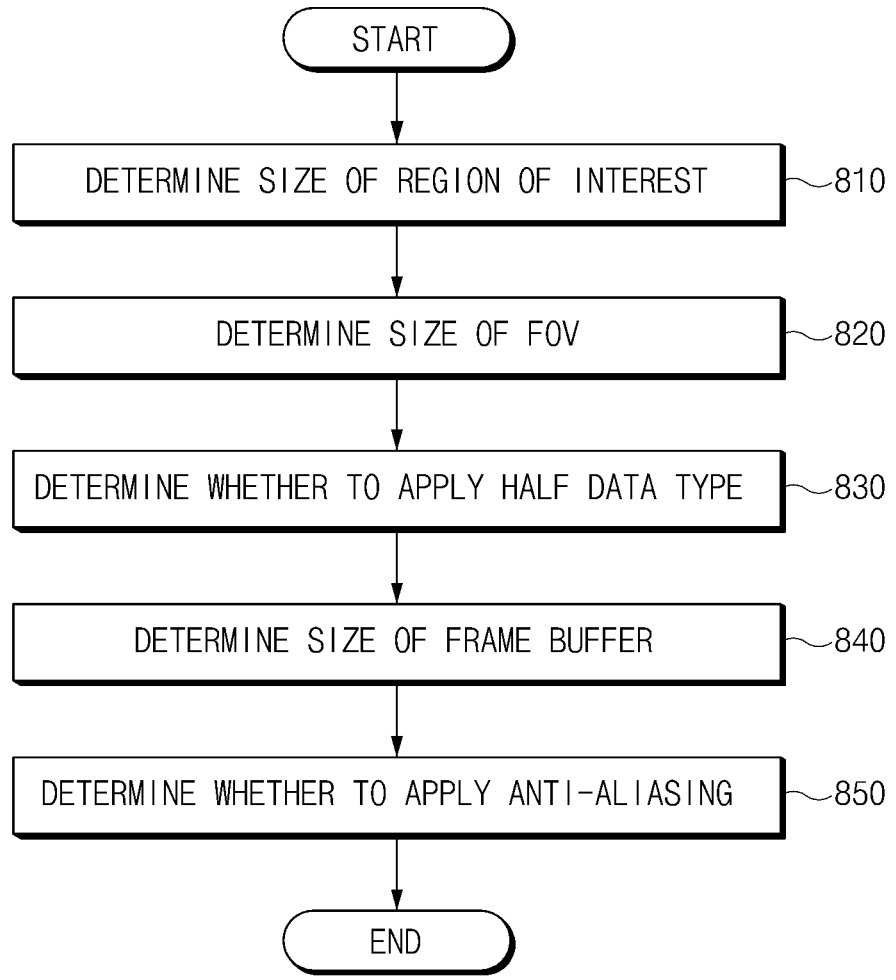
FIG. 8 is a flowchart illustrating a sequence in which tuning factors are applied, according to one embodiment.

FIG. 8 is a flowchart illustrating a sequence in which tuning factors are applied, according to one embodiment. FIG. 8 is merely illustrative, and the present disclosure is not limited thereto. Some of the operations illustrated in FIG. 8 may be omitted, or the order thereof may be changed.

Referring to FIG. 8, in the case where the processor 110 enters the foveated rendering mode, the processor 110 may sequentially apply a plurality of tuning factors.

For example, in operation 810, the processor 110 may determine the size of the region of interest (e.g. by determining the angle of the region of interest).

Specifically, in the case where the quality index selected by the user is relatively high, the processor 110 may increase the size of the region of interest. In contrast, in the case where the quality index selected by the user is relatively low, the processor 110 may decrease the size of the region of interest.

In operation 820, the processor 110 may determine the size of the FOV (e.g. by determining the angle of the FOV). For example, in the case where the quality index selected by the user is relatively high, the processor 110 may increase the size of the FOV. In contrast, in the case where the quality index selected by the user is relatively low, the processor 110 may decrease the size of the FOV In operation 830, the processor 110 may determine whether to apply half data type to the image data. For example, in the case where the quality index selected by the user is relatively high, the processor 110 may not apply the half data type. In contrast, in the case where the quality index selected by the user is relatively low, the processor 110 may apply the half data type to reduce computational complexity.

In operation 840, the processor 110 may determine the size of a frame buffer. For example, in the case where the quality index selected by the user is relatively high, the processor 110 may increase the size of the second buffer. In contrast, in the case where the quality index selected by the user is relatively low, the processor 110 may decrease the size of the second buffer.

In another example, in the case where the quality index selected by the user is relatively high, the processor 110 may increase the size of the output buffer. In contrast, in the case where the quality index selected by the user is relatively low, the processor 110 may decrease the size of the output buffer.

In operation 850, the processor 110 may determine whether or how to apply anti-aliasing. For example, in the case where the quality index selected by the user is relatively high, the processor 110 may apply temporal anti-aliasing. In contrast, in the case where the quality index selected by the user is relatively low, the processor 110 may apply a Gaussian anti-aliasing filter.

According to one embodiment, an electronic device includes display, an eye-tracking unit configured to obtain a user's gaze information, and a processor, wherein the processor is configured to determine the user's region of interest of an image to be displayed on the display, by using the gaze information, collect context information of the electronic device, determine first attribute information relating to image processing for the region of interest of the image and second attribute information relating to image processing for the remaining region other than the region of interest of the image, based at least on the context information, and display, on the display, a first partial image obtained by the image processing for the region of interest using the first attribute information and a second partial image obtained by the image processing for the remaining region using the second attribute information.

According to one embodiment, the context information includes at least one of processing context information, temperature context information, and memory utilization context information of the electronic device.

According to one embodiment, the processor is further configured to analyze scene information of the image to be displayed, and determine scene complexity of the image, based on the analysis result.

According to one embodiment, the processor is further configured to receive a user input selecting a processing mode for the image, and determine the first attribute information and/or the second attribute information based at least in part on the selected processing mode.

According to one embodiment, the processor is further configured to, when the processing mode is a first condition, determine the first attribute information and/or the second attribute information to make a processing speed of the image a priority, and when the processing mode is a second condition, determine the first attribute information and/or the second attribute information to make a processing quality of the image a priority.

According to one embodiment, the processor is further configured to combine the first partial image and the second partial image.

According to one embodiment, the first attribute information includes information about a size or angle of the region of interest.

According to one embodiment, the second attribute information includes at least one of information about a size or angle of the remaining region and whether to apply anti-aliasing to the remaining region.

According to one embodiment, the first attribute information and/or the second attribute information include at least one of information related to whether to apply a half data type to image data of the image and information about sizes of one or more frame buffers for the first partial image and the second partial image.

According to one embodiment, an electronic device includes a display configured to output at least part of a 3D image, an eye-tracking unit configured to track a user's gaze direction, a memory, and a processor, wherein the processor is configured to collect at least one of status information of the electronic device, analysis information of the 3D image, and user input information about an output of the 3D image, determine a tuning factor for applying foveated rendering to the outputted part of the 3D image, based on the collected information, and apply the foveated rendering to the outputted part of the 3D image, based on the determined tuning factor.

According to one embodiment, the user input information includes information about a quality index and/or a performance index selected by the user through a user interface, and the processor is further configured to determine the tuning factor based on the selected quality index and/or the selected performance index.

According to one embodiment, the processor is configured to determine the tuning factor before outputting the 3D image.

According to one embodiment, the processor is configured to determine the tuning factor while outputting the 3D image.

According to one embodiment, the quality index corresponds to an output resolution of the 3D image, and the performance index corresponds to a framerate of the 3D image.

According to one embodiment, the quality index is inversely proportional to the performance index.

According to one embodiment, the analysis information includes image complexity determined based on a type of the 3D image, information related to objects in the 3D image, and/or a resolution of the 3D image.

According to one embodiment, the status information includes at least one of a processor load, a GPU load, power remaining in a battery of the electronic device, and internal or external temperature of the electronic device.

According to one embodiment, the user input information is collected through a user interface including a plurality of items relating to the output of the 3D image, and the processor is further configured to determine the tuning factor based on an item among the plurality of items selected by the user.

According to one embodiment, the processor is further configured to calculate time for displaying one or more frames of the 3D image, and determine the tuning factor within the time.

According to one embodiment, the electronic device is either a head mount device (HMD) or a smart glass device designed to be worn on the user's head.

The term "module" used herein may refer to, for example, a unit including one of hardware, software and firmware or a combination thereof. The term "module" may be interchangeably used with the terms "unit," "logic," "logical block," "component" or "circuit." The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 110), the processor may perform functions corresponding to the instructions. The computer-readable storage medium may be, for example, the memory 115.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

For example, an electronic device may include a processor and a memory for storing computer-readable instructions. The memory may include instructions for performing the above-mentioned various methods or functions when executed by the processor. For example, the memory may include instructions that, when executed by the processor, cause the processor to determine the user's region of interest of an image to be displayed on the display, by using the user's gaze information, collect context information of the electronic device, determine first attribute information relating to image processing for the region of interest of the image and second attribute information relating to image processing for the remaining region other than the region of interest of the image, based at least on the context information, and display, on the display, a first partial image obtained by the image processing for the region of interest using the first attribute information and a second partial image obtained by the image processing for the remaining region using the second attribute information.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
a display;
an eye-tracking unit configured to obtain a user's gaze information; and
a processor,
wherein the processor is configured to:
determine a region of interest of an image to be displayed on the display, by using the user's gaze information;
collect context information regarding a temperature of the electronic device, power remaining in a battery of the electronic device, or a memory utilization of a memory of the electronic device;
display, on the display, a user interface for selecting a quality of a first partial image of the region of interest;
receive a user input on the user interface;
determine first attribute information relating to image processing for the region of interest of the image and second attribute information relating to image processing for a remaining region other than the region of interest of the image, based on the context information and the quality selected by the user input; and
display, on the display, the first partial image obtained by the image processing for the region of interest using the first attribute information and a second partial image obtained by the image processing for the remaining region using the second attribute information.

2. The electronic device of claim 1, wherein the processor is further configured to:
analyze scene information of the image to be displayed; and
determine scene complexity of the image, based on the analysis result.

3. The electronic device of claim 1, wherein the processor is further configured to:
when the quality selected by the user input is in a first condition, determine the first attribute information and/or the second attribute information to make a processing speed of the image a priority; and
when the quality selected by the user input is in a second condition, determine the first attribute information and/or the second attribute information to make a processing quality of the image a priority.

4. The electronic device of claim 1, wherein the processor is further configured to combine the first partial image and the second partial image.

5. The electronic device of claim 1, wherein the first attribute information includes information about a size or angle of the region of interest.

6. The electronic device of claim 1, wherein the second attribute information includes at least one of information about a size or angle of the remaining region and whether to apply anti-aliasing to the remaining region.

7. The electronic device of claim 1, wherein the first attribute information and/or the second attribute information include at least one of information related to whether to apply a half data type to image data of the image and information about sizes of one or more frame buffers for the first partial image and the second partial image.

8. The electronic device of claim 1, wherein the eye-tracking unit comprises six infrared lighting devices for each eye of the user and one or more cameras for capturing light reflected from the user's eyes.

9. An electronic device comprising:
a display configured to output at least part of a 3D image;
an eye-tracking unit configured to track a user's gaze direction;
a memory; and
a processor,
wherein the processor is configured to:
collect status information of the electronic device, wherein the status information is regarding a temperature of the electronic device, power remaining in a battery of the electronic device, or a memory utilization of the memory;
display, on the display, a user interface for selecting a quality of a first partial image of a region of interest of the 3D image;
receive a user input on the user interface;
determine a tuning factor for applying foveated rendering to the first partial image of the 3D image, based on the collected status information and the quality selected by the user input; and apply the foveated rendering to the first partial image of the 3D image, based on the determined tuning factor.

10. The electronic device of claim 9, wherein:
the processor is further configured to:
determine a quality index and/or a performance index selected by the quality selected by the user input, and
determine the tuning factor based on the quality index and/or the performance index.

11. The electronic device of claim 10, wherein the quality index corresponds to an output resolution of the 3D image, and
wherein the performance index corresponds to a framerate of the 3D image.

12. The electronic device of claim 10, wherein the quality index is inversely proportional to the performance index.

13. The electronic device of claim 9, wherein:
the processor is further configured to collect analysis information of the 3D image, and
the analysis information includes image complexity determined based on a type of the 3D image, information related to objects in the 3D image, and/or a resolution of the 3D image.

14. The electronic device of claim 9, wherein the processor is further configured to:

calculate time for displaying one or more frames of the 3D image; and
determine the tuning factor within the time.

15. An image output method performed in an electronic device configured to output at least part of a 3D image, the method comprising:
collecting status information of the electronic device, wherein the status information is regarding a temperature of the electronic device, power remaining in a battery of the electronic device, or a memory utilization of a memory of the electronic device;
displaying a user interface for selecting a quality of a first partial image of a region of interest of the 3D image;
receiving a user input on the user interface;
determining a tuning factor for applying foveated rendering to the first partial image of the 3D image, based on the collected status information and the quality selected by the user input; and
applying the foveated rendering to the first partial image of the 3D image, based on the determined tuning factor.

16. The method of claim 15, wherein the determining of the tuning factor further comprises:
determining the tuning factor based on the quality index and/or the performance index.

* * * * *